United States Patent Office 3,457,130
Patented July 22, 1969

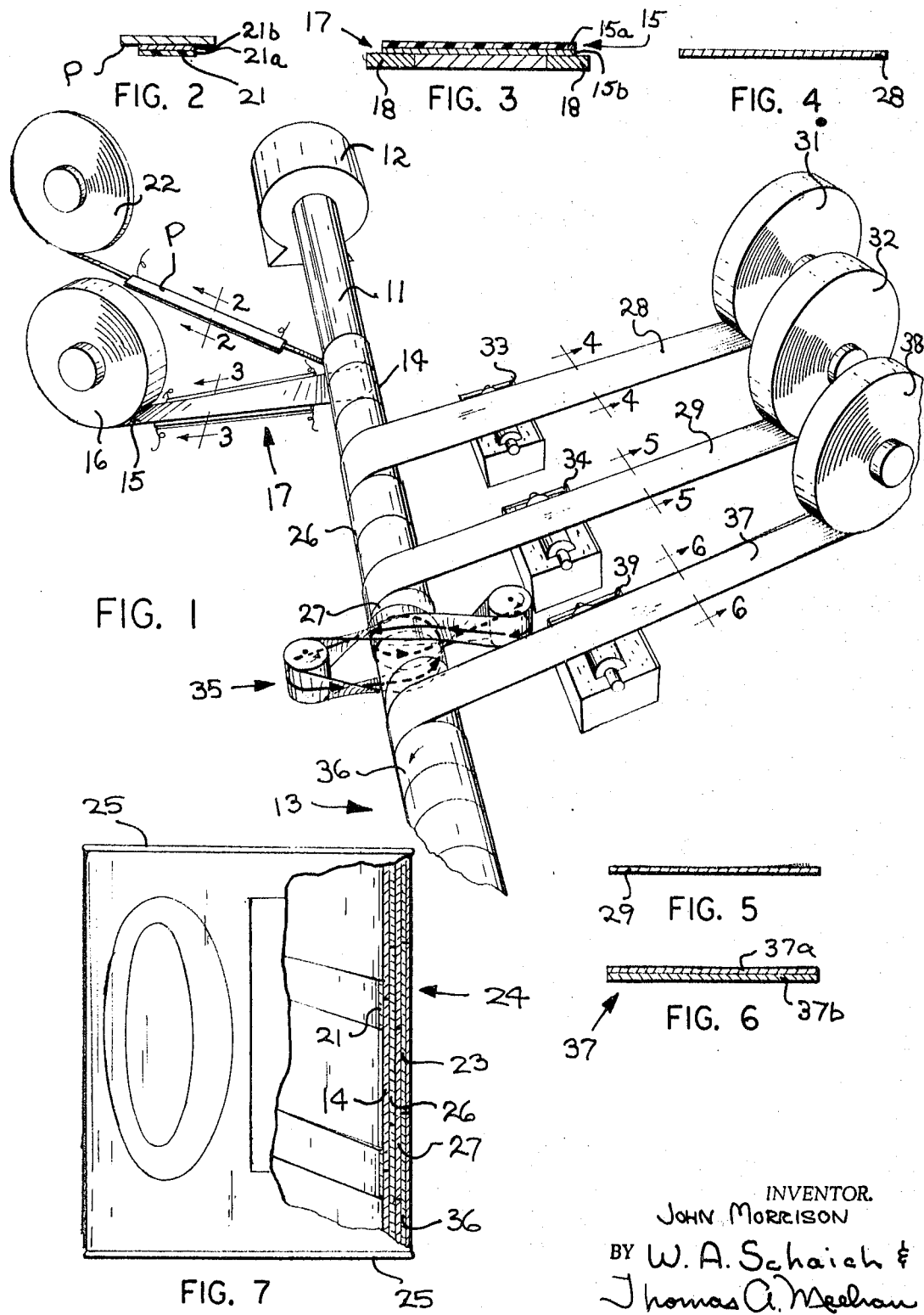

1

3,457,130
METHOD AND APPARATUS FOR FORMING A TUBULAR ARTICLE OF WOUND PLIES OF THERMOPLASTIC STRIP MATERIAL
John Morrison, Toledo, Ohio, assignor to Owens-Illinois, Inc., a corporation of Ohio
Filed July 11, 1966, Ser. No. 564,069
Int. Cl. B31c 3/00; B65h 81/00; B32b 31/00
U.S. Cl. 156—190        5 Claims

ABSTRACT OF THE DISCLOSURE

This application discloses a cylindrical container for packaging fluent materials, e.g. motor oil and food shortening, in which the cylindrical body portion of such container is of spirally wound, composite construction, having one or more structural body plies formed of fibreboard. To prevent the fluent packaged product from seeping into, and therefore weakening the fibreboard in the cylindrical body, the body comprises a fluid-impervious fluent product-contacting liner ply of thermoplastic material which is also formed by spiral winding, and which therefore has a spirally extending seam defined by the adjacent edges of successive convolutions of the spirally wound layer. The spiral seam is sealed against penetration by the packaged product by a length of tape of thermoplastic material which overlaps the adjacent edge portions of successive liner ply convolutions and which is heat sealed to such overlapped portions.

This application also discloses method and apparatus for continuously producing a spirally wound composite tube from which container bodies may be formed by severing, by which method and apparatus the sealing thermoplastic tape and the edges of the thermoplastic liner ply are heated as the ply and the web are advancing to the winding mandrel to effect heat sealing of the tape to the liner.

---

This invention relates to a tubular article formed by winding a multiplicity of plies of elongate strip-like material into a composite structure and to spiral winding process and apparatus for producing such an article. More particularly, the invention relates to such a tubular article which has one or more structural plies of a fibreboard material and which has, when cut into lengths of a predetermined size, utility in the manufacture of can bodies for the packaging of various fluent materials, such as motor oil, the innermost ply of such article being an impervious ply of a thermoplastic material to prevent the packaged product from leaking out or from being contaminated by the structural plies or, in some cases, to protect the fibreboard structural ply or plies from the weakening effects of the product. The invention also relates to a spiral winding process and apparatus for producing such an article.

In recent years it has become increasingly more popular to construct can bodies for motor oil and other fluent products from a composite tubular article comprising one or more main structural plies each of which is formed by spirally winding an elongate strip of a sturdy grade of fibreboard, such as kraft linerboard, into a tubular form with edges of adjacent convolutions thereof being in abutting relationship. In such a construction it is important to protect the fibreboard strand from undesirable contact with the fluid materials intended to be packaged in the container formed therefrom. In the packaging of motor oil, for example, such protection has been heretofore provided by bonding the fibreboard body to an innermost fluid-impervious ply formed by spirally winding a strand of a suitable material into a cylindrical form. The materials most popularly used heretofore are metal foil (or metal foil bonded to paper as a backing material) and, particularly in the case of motor oil, glassine or greaseproof paper. The use of metallic foil, or foil-coated paper, is expensive if the foil thickness is maintained sufficiently large to avoid the danger of "pin-hole leaks" resulting from many foil rolling processes and which allow the fluid packaged material to seep into the structural fibreboard ply(s), through which the fluid will diffuse rather quickly by capillary action (wicking). Glassine or greaseproof paper, while satisfactory as a barrier to a petroleum product such as motor oil, is a poor barrier to moisture with the result that the moisture normally present in the fibreboard body will, over a short period of time, escape through the glassine inner liner ply, especially in unfilled cans, thereby leading to embrittling of the fibreboard body with consequent reduced resistance to shipping abuse.

In accordance with the present invention, these and other problems associated with the teachings of the prior art in this area are met by constructing the inner liner ply of such a composite article from a spirally wound elongate strand of thermoplastic material, such as high-density polyethylene and polypropylene, materials which are effective barriers both to moisture and most packaged materials, including motor oil, and which are economically attractive for such application.

In the preferred embodiment of the present invention, the thermoplastic inner liner of such a composite article is provided with a spirally extending butt seam which is effectively sealed by a narrow strip of thermoplastic material which extends continuously along such spiral butt seam and is bonded by heat sealing to each of the edges of adjacent convolutions of the inner liner. Such a sealing technique has been found to be more effective than a single thickness lapped seam and to be advantageous in relationship to a double thickness lapped seam (folded lap seam) in that it results in a thinner inward protrusion at the location of the spiral seam which makes it less difficult to obtain a good seal between a can body formed from such a tubular article and an end closure member applied thereto.

For a further understanding of the present invention, attention is directed to the following portion of the specification, the drawing and the appended claims.

In the drawing:

FIG. 1 is a schematic view, in perspective, of a preferred embodiment of apparatus in accordance with the present invention for use in the practice of a process in accordance with the present invention and in the manufacture of an article in accordance with the present invention;

FIGS. 2, 3, 4, 5 and 6 are sectional views taken on lines 2—2, 3—3, 4—4, 5—5 and 6—6, respectively, of FIG. 1.

FIG. 7 is an elevational view, partly in section, of a container having a body portion comprising an article in accordance with the present invention.

In accordance with the present invention, there is provided a cylindrical forming mandrel 11 of substantial length mounted in over-hanging fashion by means of bearing block 12. A tubular article 13 of composite construction is formed on mandrel 11 from a multiplicity of plies of different materials arranged in radial sequence, each ply of which may be formed by spirally winding a strip of such material into a tubular configuration with the edges of adjacent convolutions of each of such plies being in abutting relationship. In accordance with the present invention, the innermost ply 14 of the tubular article 13 is formed by advacing a wide strip 15 comprising a thermoplastic facing 15a laminated to a paper backing 15b, which may be formed by extrusion coating of backing 15b longitudinally of itself toward mandrel 11 from a supply reel 16 thereof and at a suitable lead angle, relative to the central axis of mandrel 11, to form innermost ply 14 as its advance is continued around mandrel 11. As strip 15 advances from supply reel 16 to mandrel 11 it passes over a platen 17 comprising edge portions 18 which are heated by electrical resistors or similar means.

Simultaneous with the advance of wide strip 15 to mandrel 11 to form ply 14, there is effected the advance of a narrow strip of material 21 comprising thermoplastic material 21a bonded to a backing 21b, which is preferably glassine in the construction of can bodies for motor oil and is preferably a transparent thermoset material, such as polyester, in the construction of can bodies for food shortening, to lie between mandrel 11 and ply 14 bridging the spiral seam defined by adjacent edges of ply 14 in a continuous pattern. As strip 21 advances from a supply roll 22 thereof to mandrel 11, it passes in contact with a platen P which is internally heated, as by electrical resistors. Strip 21 and the edges of strip 15 are heated sufficiently to effect bonding of the thermoplastic material in strip 21 to the edges of the underlying convolutions of the thermoplastic material in strip 15 by heat sealing.

In the manufacture of a tubular article for use, as a body portion 23 in a container 24 comprising such body portion 23 in combination with first and second end closure members 25 engaged thereto in a conventional fashion, as is shown in FIG. 7, the thermoplastic material in strands 15 and 21 will desirably be high-density polyethylene when the product to be packaged is lubricating oil for an internal combustion engine (motor oil), one of the most popular packaging applications for composite or fibre containers. In containers for other packaging applications, such as food shortening, such thermoplastic material may desirably comprise polypropylene, preferably laminated to aluminum foil. In any event, it is advantageous to impart a light coating of a slip agent to the side of strip 15 which forms the surface of ply 14 in contact with mandrel 11. While many of such agents are known, a silicone-type (polysiloxane) coating marketed by Dow Corning under the designation "Syl-Off 1177" has been found to be particularly satisfactory.

The tubular article 13 is thereafter formed in rather conventional fashion by superimposing on ply 14 one or more, shown as two, reinforcing plies 26 and 27 formed in radial succession by spirally winding strips of kraft linerboard 28 and 29, respectively, or other sturdy grade of fibreboard suitable for such application. Strips 28 and 29, are delivered from supply reels 31 and 32, respectively, and each has adhesive applied to the side thereof which contacts a side of the next underlying ply of the composite article, as by conventional glue applicating means 33 and 34, respectively.

The advancement of the article comprising plies 14, 26 and 27 along the axis of mandrel 11, with consequent advancement of strips 15, 21, 28 and 29 to mandrel 11, may be effected by a conventional frictional belt drive system 35. Thereafter, tubular article 13 may be completed by bonding to ply 27 a label ply 36 formed by spirally winding a strip 37 of label stock from a supply reel 38 thereof about ply 27, there also being provided glue applicating means 39 for applying adhesive to the underside of strip 37 to effect such bond. As is conventional, strip 37 may comprise a layer of printed aluminum foil 37a laminated to paper backing 37b for support.

It is believed that the best mode known to me to carry out this invention has been described above in terms sufficiently full, clear, concise and exact as to enable any person skilled in the art to make and use the same.

I claim:

1. A process for winding a tubular article comprising, the steps of: providing a cylindrical winding mandrel; advancing a wide strand of thermoplastic material longitudinally of itself to a position in contact with the mandrel and in a direction having a component of motion parallel to the central axis of the mandrel; continuing the advance of the strand of thermoplastic material to spirally wind said strand about said mandrel into a tubular form with the edges of adjacent convolutions of said tubular form being in abutting relationship to one another; heating the edges of said strand as said strand advances to said mandrel; advancing a narrow strand of thermoplastic material longitudinally of itself to a position between said mandrel and an edge of said wide strand to continually cover said edge and to continually extend beyond said edge with the thermoplastic material in the narrow strip being in face-to-face contact with the thermoplastic material in the bridged portions of the wide strip; heating said narrow strand as it advances toward said mandrel; and continuing the advance of said narrow strands in conjunction with said wide strand to effect bonding of said narrow strand to said wide strand by then heat sealig of said narrow strand to said wide strand in a continuous pattern covering the spiral seam defined by the edges of adjacent convolutions of said wide strand.

2. A process as defined by claim 1 and further comprising: advancing a strand of fibreboard material longitudinally of itself to a position in contact with the side of said wide strand which is away from the mandrel; applying an adhesive to the side of said fibreboard strand which contacts said wide strand; and continuing the advance of said fibreboard strand with said wide strand to form a continuous ply bonded to the ply formed by the wide strand and having a spirally extending butt seam defined by adjacent edges of adjacent convolutions of said fibreboard strand.

3. Apparatus for winding a tubular article comprising, in combination: a cylindrical winding mandrel; means for delivering a wide strip of thermoplastic material longitudinally of itself to said mandrel for spiral winding thereon into a tubular form with adjacent edges of adjacent convolutions of said tubular form being in continuous abutting relationship; means for heating the edge portions of said wide strip as it progresses to said mandrel; means for delivering a narrow strip of thermoplastic material longitudinally of itself to said mandrel to be between said mandrel and said wide strip continuously bridging the spiral seam formed by said adjacent edges of the convolutions of the wide strip with the thermoplastic material in the narrow strip being in face-to-face contact with the thermoplastic material in the bridged portions of the wide strip; and means for heating said narrow strip as it progresses to said mandrel, whereby the heated narrow strip is bonded to the heated edges of said convolutions by heat sealing.

4. Apparatus as defined in claim 3 wherein said means for heating the edge portions of the wide strip comprises a platen for supporting said strip as it progresses toward said mandrel and means for heating the edge portions of said platen.

5. Apparatus as defined in claim 4 wherein said means for heating the narrow strip comprises a heated platen which contacts said narrow strip as it progresses to said mandrel.

References Cited

UNITED STATES PATENTS

| 3,274,905 | 9/1966 | Demsey et al. | 156—190 XR |
| 3,280,709 | 10/1966 | Elam | 156—190 XR |
| 3,196,762 | 7/1965 | Schmeltz | 156—190 XR |

EARL M. BERGERT, Primary Examiner

P. DIER, Assistant Examiner

U.S. Cl. X.R.

93—80, 94; 138—144, 154; 156—195, 432, 499; 229—4.5